(12) United States Patent
Wentink et al.

(10) Patent No.: US 8,014,323 B2
(45) Date of Patent: Sep. 6, 2011

(54) SYSTEMS AND METHODS FOR FACILITATING COMMUNICATION BETWEEN COMMUNICATION DEVICES

(75) Inventors: Menzo Wentink, Utrecht (NL); Trent Carter, Indialantic, FL (US)

(73) Assignee: Xocyst Transfer AG L.L.C., Wilmington, DE (US)

( * ) Notice: Subject to any disclaimer, the term of this patent is extended or adjusted under 35 U.S.C. 154(b) by 491 days.

(21) Appl. No.: 11/556,916

(22) Filed: Nov. 6, 2006

(65) Prior Publication Data

US 2007/0104201 A1 May 10, 2007

Related U.S. Application Data

(60) Provisional application No. 60/735,248, filed on Nov. 8, 2005.

(51) Int. Cl.
*H04B 7/005* (2006.01)

(52) U.S. Cl. ......................... 370/278; 370/311

(58) Field of Classification Search .................. 370/278, 370/311, 328, 338; 709/223, 224, 226
See application file for complete search history.

(56) References Cited

U.S. PATENT DOCUMENTS

| 7,603,146 | B2* | 10/2009 | Benveniste | 455/574 |
| 7,668,128 | B1* | 2/2010 | Benveniste | 370/311 |
| 7,668,129 | B2* | 2/2010 | Alon et al. | 370/311 |
| 2005/0047357 | A1* | 3/2005 | Benveniste | 370/311 |
| 2005/0136833 | A1* | 6/2005 | Emeott et al. | 455/11.1 |
| 2005/0138451 | A1* | 6/2005 | Simpson et al. | 713/320 |
| 2005/0237984 | A1* | 10/2005 | Benveniste | 370/338 |

* cited by examiner

*Primary Examiner* — Jung Park

(57) ABSTRACT

Systems and methods for facilitating communication between communication devices are provided. An exemplary method includes: sending an indication signal by a second communication device to a first communication device, the indication signal corresponding to a request to receive buffered data from the first communication device; and sending a data frame by the second communication device to the first communication device.

17 Claims, 9 Drawing Sheets

SYSTEMS AND METHODS FOR FACILITATING COMMUNICATION BETWEEN COMMUNICATION DEVICES

CROSS-REFERENCE TO RELATED APPLICATION

This application claims the benefit of provisional application 60/735,248, filed on Nov. 8, 2005, which is hereby incorporated by reference.

DESCRIPTION OF THE RELATED ART

Unlike wired computational devices, which are powered by power-grid distribution sources, wireless computational devices are meant to be portable and are typically battery powered. Hence, wireless computational devices need to be designed for efficient power consumption.

There exist several methods such as legacy 802.11 power save mechanism and Unscheduled Automatic Power Save Delivery (U-APSD) for reducing the power consumed by battery powered 802.11 compliant devices.

In accordance with the legacy 802.11 power save mechanism, the 802.11 compliant devices switch to a power save mode when not engaged in network communication. An access point buffers incoming data for such power-saving 802.11 compliant devices and sends a beacon signal after a pre-defined time interval indicating the presence of buffered data for the power-saving 802.11 compliant devices. Such a device switches from the power save mode to an active mode to receive and check the beacon signal for any indication of buffered data at the access point for the device. If there is any indication of buffered data at the access point, then the device sends a Power Save-Poll (PS-Poll) to the access point requesting the access point to send the buffered data to the device. The access point responds by transmitting buffered data to the device. The buffered data is transmitted in the form of data frames, which carry an indication of any additional buffered data at the access point. If there is such an indication, then the device transmits another PS-Poll and receives the additional buffered data. This process repeats until there is no further indication of additional buffered data at the access point. Thereafter, the device switches back to the power save mode, thereby conserving power.

In Unscheduled Automatic Power Save Delivery (U-APSD), a power-saving 802.11 compliant device does not wait for the beacon signal from the access point. In particular, such a device becomes active when the device has data frames to be transmitted to the access point. The transmission of data frames to the access point (known as an uplink transmission) acts as an implicit trigger that causes the access point to check for buffered data for the device. Responsive to locating any such buffered data, that data is transmitted from the access point to the device (known as a downlink transmission). This reduces the time during which the device is active, thus reducing power consumption.

SUMMARY

In this regard, systems and methods for facilitating communication between communication devices are provided. An exemplary embodiment of such a method comprises: sending an indication signal by a second communication device to a first communication device, the indication signal corresponding to a request to receive buffered data from the first communication device; and transmitting a data frame by the second communication device to the first communication device.

Another embodiment of such a method comprises: receiving, at a first communication device, an indication signal transmitted from a second communication device, the indication signal corresponding to a request to receive buffered data from the first communication device; receiving, at the first communication device, a data frame from the second communication device; and responsive to receiving the indication signal, transmitting the buffered data from the first communication device to the second communication device.

An exemplary embodiment of such a system comprises a second communication device operative to transmit an indication signal and a data frame to a first communication device. The indication signal corresponds to a request to receive buffered data from the first communication device.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Various embodiments of the invention will hereinafter be described in conjunction with the appended drawings provided to illustrate and not to limit the invention, wherein like designations denote like elements, and in which.

DETAILED DESCRIPTION

Systems and methods for facilitating communications between communication devices are provided. In particular, some embodiments may reduce the overall power consumption of 802.11 compliant devices engaged in wireless communication, for example. In some embodiments, backward compatibility with access points already deployed for network communication is maintained. Specifically, some embodiments may coexist with existing mechanisms for power saving in wireless devices, like the legacy 802.11 power save mode and other standards-based power-saving modes. Additionally or alternatively, some embodiments can exhibit reduced code footprint and use reduced host and/or MAC (media access control) clock cycles. Notably, one perceived advantage, in some embodiments, involves the ability to reduce the delay between transmitted and received data frames for Voice over Internet Protocol (VOIP) applications.

In some embodiments, reduced power consumption of a device is achieved by the device providing an indication signal, which indicates to an access point an ability to receive any buffered downlink traffic. Notably, this is facilitated prior to the device receiving an indication of the availability of buffered data for downlink from the access point. In some embodiments, the uplink transmission is sent after the indication signal and the device stays in an active mode to receive any downlink traffic. The device switches to a power save mode when all the currently available downlink data frames are received from the access point.

Figure 1:
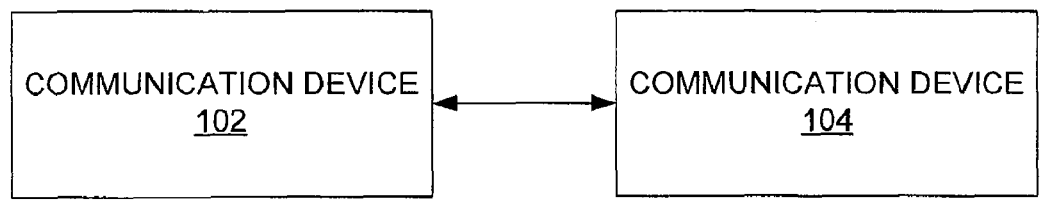
FIG. 1 is a block diagram of an embodiment of a system for facilitating communications between communication devices.

Referring now in more detail to the drawings, FIG. 1 is a block diagram of an embodiment of a system for facilitating communications between wireless devices. In this regard, system 100 includes a first communication device 102 and a second communication device 104. Examples of the first communication device 102 include, but are not limited to, an access point. Examples of second communication device 104 include, but are not limited to, a VoIP handset, a computer and a laptop with wireless network card enabled for wireless communication, and a mobile phone. Notably, system 100 could include more communication devices than shown in FIG. 1, however, such devices are omitted for ease of description.

In operation, first communication device 102 and second communication device 104 exchange data frames over an air interface facilitated by a communication network (not shown). Such a communication network can comprise packet-based networks such as a wireless Local Area Network (WLAN) and/or a private network connected to a public network (or the Internet) through first communication device 102.

Second communication device 104 and first communication device 102 interact by exchanging data frames. The data frames transmitted by first communication device 102 to second communication device 104 constitute downlink traffic, while the data frames transmitted by second communication device 104 to first communication device 102 constitute uplink data traffic. The data frames received at first communication device 102 are tagged with respect to the intended recipient in order to differentiate previously buffered data frames from those received from second communication device 104. First communication device 102 buffers received data frames, which are then transmitted to the intended recipients, such as second communication device 104.

Figure 2:
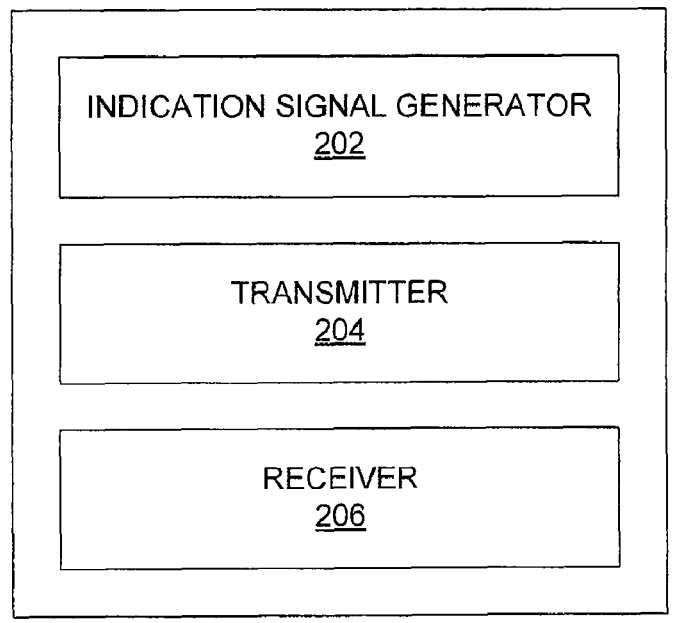
FIG. 2 is block diagram of the embodiment of the second communication device of FIG. 1.

FIG. 2 is a block diagram showing detail of the embodiment of second communication device 104 of FIG. 1. As shown in FIG. 2, second communication device 104 includes an indication signal generator 202, a transmitter 204 and a receiver 206.

In operation, indication signal generator 202 sends an indication signal to first communication device 102 responsive to the second communication device switching to an active mode. In some embodiments, this can be accomplished immediately after the switching occurs. The indication signal generator also sends the indication signal responsive to receiving an indication of the presence of buffered data, for which the second communication device is designated as the intended recipient, at first communication device. In some embodiments, the indication signal is a Power Save-Poll (PS-Poll).

Transmitter 204 is operative to transmit data frames to first communication device 102. Transmitter 204 may also determine the presence of uplink data frames so that second communication device 104 switches from a power save mode to the active mode, thereby enabling the uplink data frames to be communicated to the first communication device.

Receiver 206 receives buffered data from first communication device 102. Receiver 206 also checks received buffered data for an indication of any additional buffered data at first communication device 102. Such an indication can prevent the second communication device from reverting to the power save mode.

Figure 3:
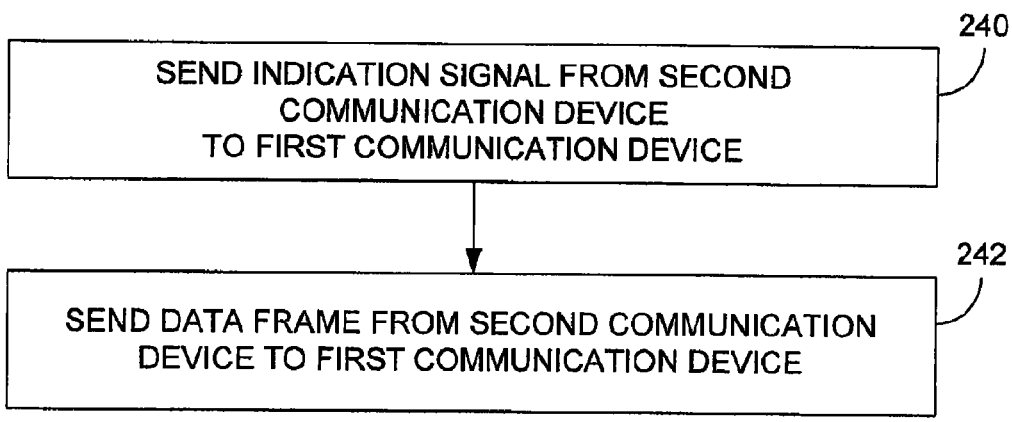
FIG. 3 is a flow chart of an embodiment of a method for facilitating communications between communication devices.

FIG. 3 is a flow chart depicting of an embodiment of a method for facilitating communications between communication devices. As shown in FIG. 3, the method may be construed as beginning at block 240, in which an indication signal is sent by the second communication device to the first communication device. Notably, the indication signal corresponds to a request to receive buffered data from the first communication device. In block 242, a data frame is sent by the second communication device to the first communication device.

Figure 4:
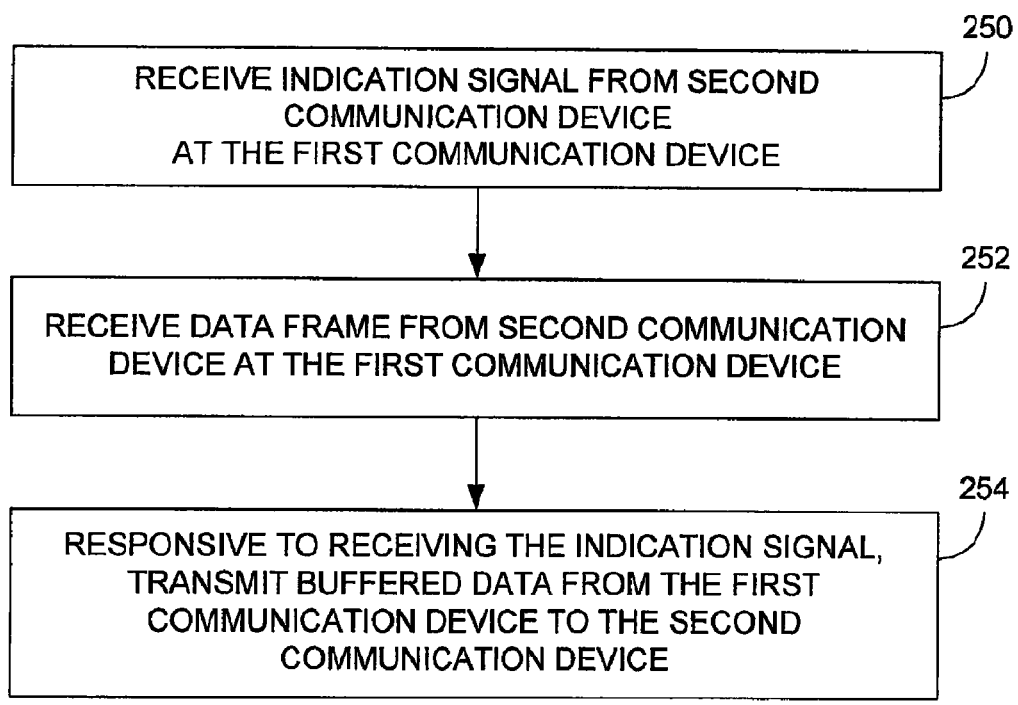
FIG. 4 is a flow chart of another embodiment of a method for facilitating communications between communication devices.

FIG. 4 is a flow chart depicting of another embodiment of a method for facilitating communications between communication devices. As shown in FIG. 4, the method may be construed as beginning at block 250, in which an indication signal sent from the second communication device is received at the first communication device. In block 252, a data frame from the second communication device is received at the first communication device. In block 254, responsive to receiving the indication signal, the buffered data is transmitted from the first communication device to the second communication device.

In an implementation of the exemplary methods of FIGS. 3 and 4, in which communications are facilitated via a wireless communication network, the first communication device can be an access point and the second communication device can be a 802.11 compliant device. In operation, the 802.11 compliant device transmits an indication signal (e.g., a PS-Poll) prior to an uplink data frame, thereby indicating to the access point that the 802.11 device is capable of receiving any buffered data from the access point. By appending the PS-Poll with the uplink data frame, the 802.11 compliant device does not have to wait for a beacon signal transmitted by the access point to receive the buffered data. Additionally, since the PS-Poll reaches the access point (in some embodiments) before the uplink data frame, the access point response time is reduced, which in turn, reduces the time for which the 802.11 compliant device is in active mode thus, reducing the power consumption. Moreover, by appending the uplink data frame with a PS-Poll, the delay between transmitted and received frames is reduced which is critical for delay-sensitive applications like VOIP.

Figure 5:
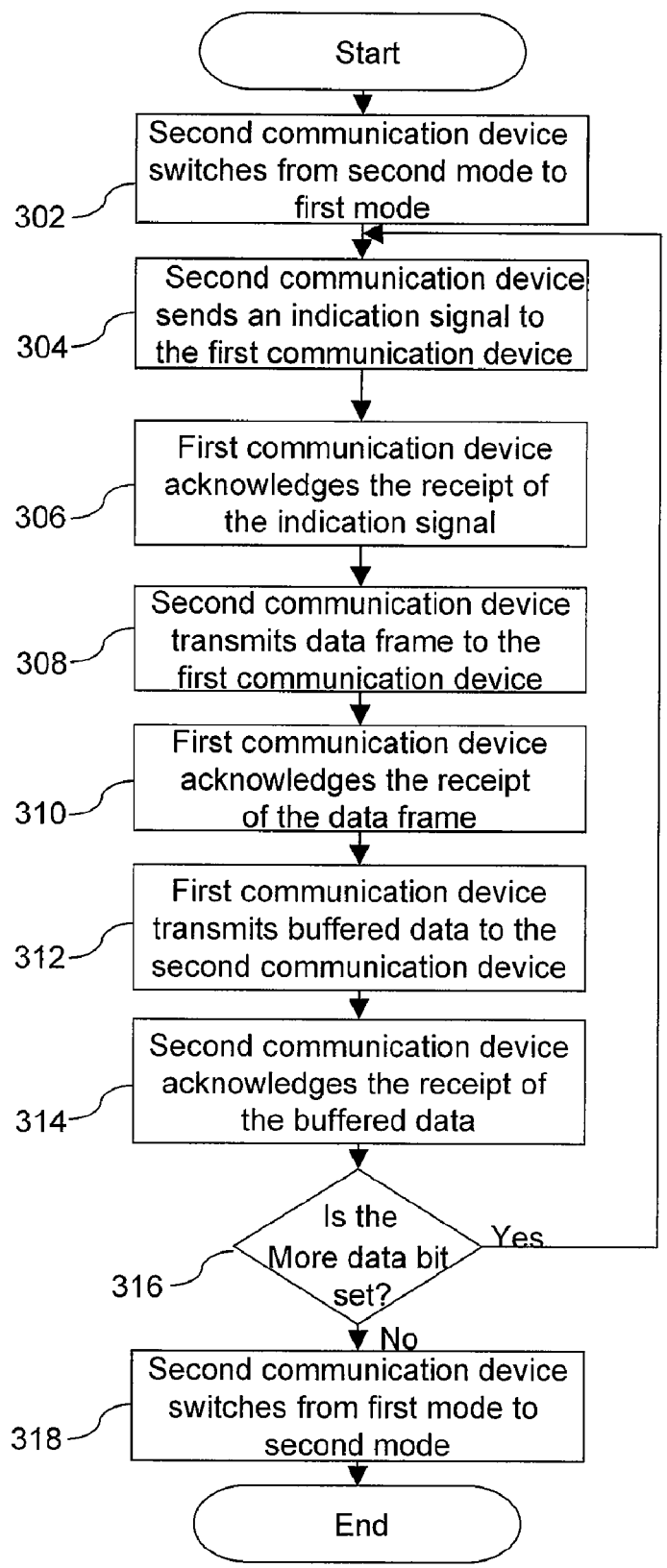
FIG. 5 is a flow chart of another embodiment of a method for facilitating communications between communication devices.

FIG. 5 is a flow chart depicting of another embodiment of a method for facilitating communications between communication devices. At step 302, the second communication device switches from a second mode to a first mode. In an embodiment, the second mode is the power save mode for the second communication device; the first mode is the active mode. In the second mode, the second communication device does not receive any data from a first communication device such as first communication device 102. Further, in the second mode, the second communication device does not send any data to the first communication device. The second communication device switches to the first mode when it has data frames to be transmitted to the first communication device. The power save mode consumes considerably less amount of power than the active mode. At step 304, the second communication device sends an indication signal to the first communication device. The second communication device sends the indication signal instantaneously (i.e. after performing a suited channel access) after switching to the first mode. The indication signal indicates to the first communication device that the second communication device is active and is ready to receive any buffered data if present, at the first communication device. At step 306, the first communication device acknowledges the receipt of the indication signal. The acknowledgment is sent in the form of an acknowledgement frame. For example, in the case of wireless network communication, the acknowledgement is sent in the form of an 802.11 ACK frame. At step 308, the second communication device transmits a data frame to the first communication device. The second communication device transmits the data frame on receiving the acknowledgement of the receipt of the indication signal by the first communication device.

At step 310, the first communication device acknowledges the receipt of the data frame sent by the second communication device. On receipt of the acknowledgement frame from the first communication device, the second communication device stays in the first mode to receive buffered data transmitted by the first communication device. Thereafter, at step 312, the first communication device transmits buffered data to the second communication device. The buffered data at the first communication device is transmitted to the second communication device in the form of data frames. At step 314, the second communication device acknowledges the receipt of the buffered data. The acknowledgment is sent in the form of an acknowledgement frame. Subsequently, the first communication device appends a 'More' data bit to the buffered data transmitted to the second communication device. The 'More' data bit is set if the first communication device has additional buffered data for the second communication device. At step 316, the second communication device checks whether the 'More' data bit in the received buffered data, is set. If the 'More' data bit in the received buffered data is set, indicating additional buffered data at the first communication device, then the second communication device sends an indication signal to the first communication device to receive the additional buffered data. If the 'More' data bit in the received buffered data is not set indicating no more buffered data at the first communication device for the second communication device, then step 318 is performed. At step 318, the second communication device switches from first mode to the second mode.

In one embodiment of the invention, the first communication device transmits a null data frame when the first communication device has no buffered data for the second communication device. The second communication device acknowledges the receipt of the null data frame by sending an acknowledgement data frame to the first communication device. The second communication device then switches from the first mode to the second mode.

In another embodiment, the first communication device does not transmit any data frame to the second communication device, when the first communication device has no buffered data for the second communication device. The second communication device stays in the first mode till there is indication of whether or not there is buffered data at the first communication device for the second communication device.

Figure 6:
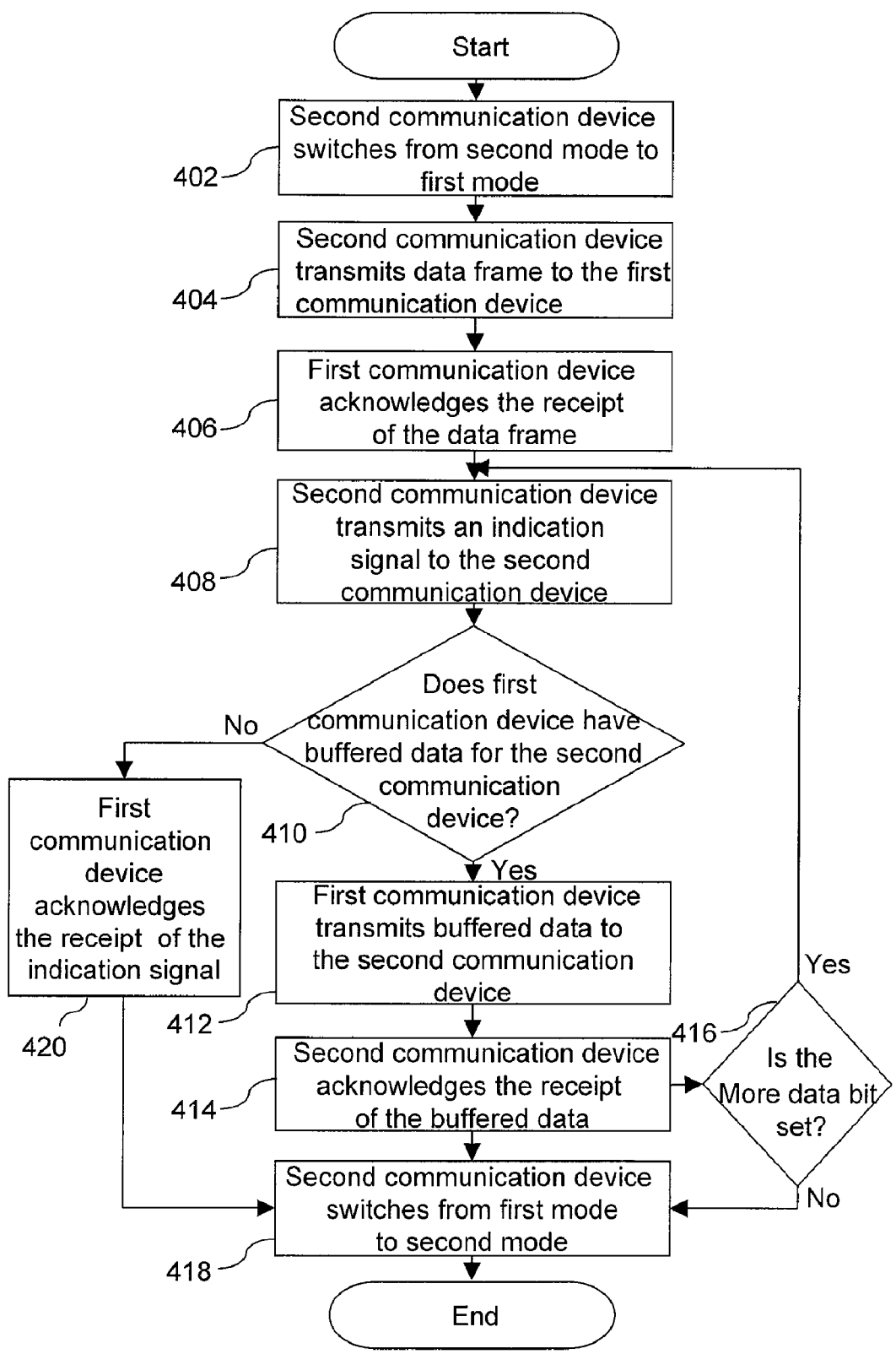
FIG. 6 is a flow chart of another embodiment of a method for facilitating communications between communication devices.

FIG. 6 is a flow chart depicting of another embodiment of a method for facilitating communications between communication devices. At step 402, the second communication device switches from a second mode to a first mode. The second communication device has data frames waiting to be transmitted to a first communication device such as first communication device 102. At step 404, the second communication device transmits a data frame to the first communication device. The second communication device transmits the data frame instantaneously after switching to the first mode. At step 406, the first communication device acknowledges the receipt of the data frame. The acknowledgment is sent in the form of an acknowledgement frame. At step 408, the second communication device sends an indication signal to the first communication device. The second communication device sends the indication signal after receiving the acknowledgement frame from the first communication device. The indication signal indicates to the first communication device that the second communication device is in the first mode and is ready to receive any buffered data if present, at the first communication device.

At step 410, the first communication device checks whether it has buffered data for the second communication device. If the first communication device has buffered data for the second communication device then step 412 is performed. At step 412, the first communication device transmits buffered data to the second communication device. At step 414, the second communication device acknowledges the receipt of the buffered data by sending an acknowledgement frame to the first communication device. At step 416, the second communication device checks whether the 'More' data bit in the received buffered data transmitted by the first communication device, is set. If the 'More' data bit in the received buffered data from the first communication device is set, indicating additional buffered data at the first communication device, then the second communication device sends an indication signal to the first communication device to receive additional buffered data. If the 'More' data bit in the received buffered data from the first communication device is not set, indicating no more buffered data at the first communication device for the second communication device, then step 418 is performed.

At step 418, the second communication device switches from the first mode to the second mode. If the first communication device does not have any buffered data for the second communication device, step 420 is performed. At step 420, the first communication device sends an acknowledgement frame to the second communication device. The next beacon indicates to the second communication device that there is no additional buffered data for the second communication device at the first communication device. The second communication device on receipt of the beacon switches from first mode to second mode. The second communication device stays in second mode, till it has data frames to be transmitted to the first communication device or it receives an indication of the buffered data at the second communication device.

Figure 7:
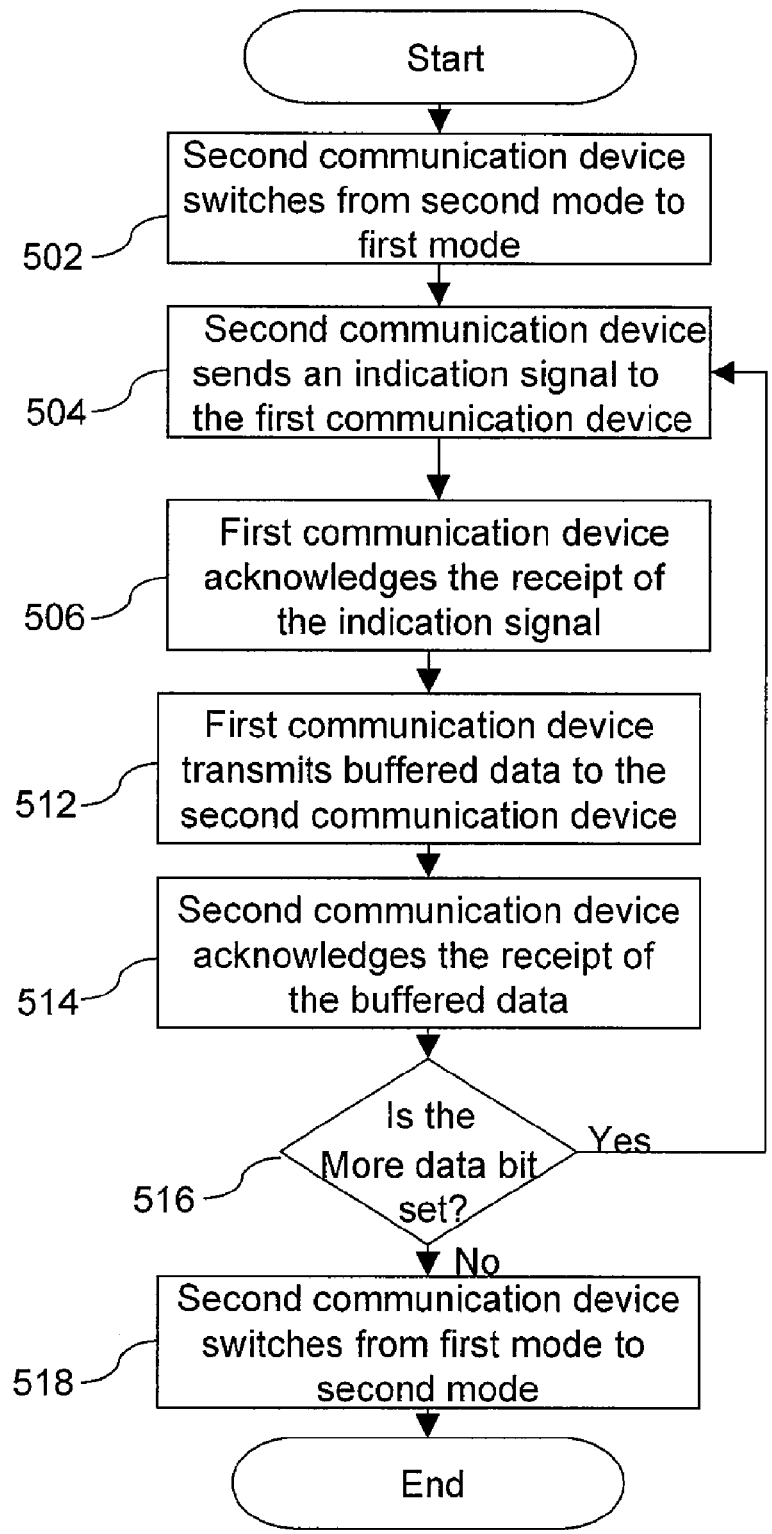
FIG. 7 is a flow chart of another embodiment of a method for facilitating communications between communication devices.

FIG. 7 is a flow chart depicting of another embodiment of a method for facilitating communications between communication devices. At step 502, the second communication device switches from a second mode to first mode and sends an indication signal to the first communication device such as first communication device 102, at pre-defined time intervals. This method can be deployed in the absence of uplink traffic, from which the wakeup timing can be determined otherwise.

The interval timer may be reset upon detection of uplink traffic, so that the pre-defined time intervals will only be activated in the absence of uplink traffic, for instance when silence suppression is activated in the uplink direction. The pre-defined interval may be selected to be higher than the typical time between uplink transmissions, for instance 40 ms, so that it will not become active when there is uplink traffic, i.e. when there is no silence suppression in the uplink direction.

At step 504, the second communication device sends an indication signal to the first communication device. The second communication device sends the indication signal instantaneously (i.e. after performing a suited channel access) after switching to the first mode. The indication signal indicates to the first communication device that the second communication device is active and is ready to receive any buffered data if present, at the first communication device. At step 506, the first communication device acknowledges the receipt of the indication signal. The acknowledgment is sent in the form of an acknowledgement frame. For example, in the case of wireless network communication, the acknowledgement is sent in the form of an 802.11 ACK frame.

The second communication device stays in the first mode to receive buffered data transmitted by the first communication device. Thereafter, at step 512, the first communication device transmits buffered data to the second communication device. The buffered data at the first communication device is transmitted to the second communication device in the form of data frames. At step 514, the second communication device acknowledges the receipt of the buffered data. The acknowledgment is sent in the form of an acknowledgement frame. Subsequently, the first communication device appends a 'More' data bit to the buffered data transmitted to the second communication device. The 'More' data bit is set if the first communication device has additional buffered data for the second communication device. At step 516, the second communication device checks whether the 'More' data bit in the received buffered data, is set. If the 'More' data bit in the received buffered data is set, indicating additional buffered data at the first communication device, then the second communication device sends an indication signal to the first communication device to receive the additional buffered data. If the 'More' data bit in the received buffered data is not set indicating no more buffered data at the first communication device for the second communication device, then step 518 is performed. At step 518, the second communication device switches from first mode to the second mode.

Figure 8:
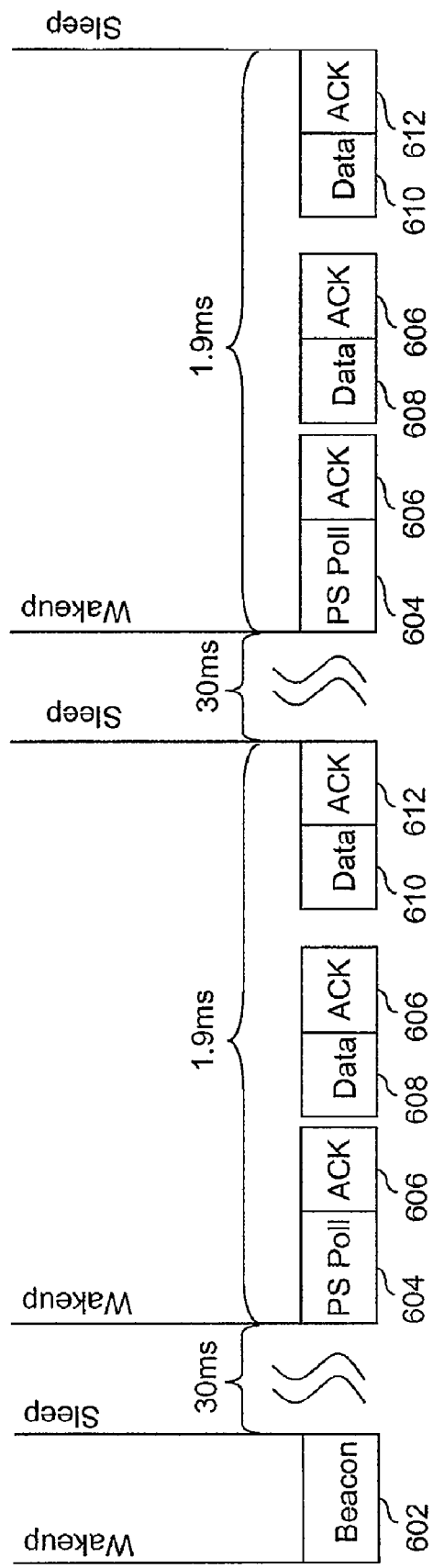
FIG. 8 is a block diagram depicting communication between the first and the second communication device in accordance with the method described in FIG. 5.

FIG. 8 is a block diagram depicting communication between a first and a second communication device in accordance with the method described in FIG. 5. A first communication device such as first communication device 102 broadcasts a second indication signal at pre-defined intervals. In one embodiment, the second indication signal is a beacon such as a beacon 602. Beacon 602 is a broadcast signal carrying an indication of buffered data at the first communication device for at least one second communication device such as second communication device 104. For example, in the case of communication between 802.11 compliant devices, an access point may broadcast a beacon signal at pre-defined time intervals such as, for example, 100 milliseconds.

The second communication device switches from second mode to first mode to receive beacon 602. If beacon 602 carries indication of buffered data for the second communication device, then the second communication device sends a request to the first communication device to receive buffered data in the form of a Power-Save Poll (PS-Poll) such as a PS-Poll 604. The second communication device sends PS-Poll 604 to receive buffered data at the first communication device.

For example, in case of communication between 802.11 compliant devices, the second communication device sends a Power-Save Poll (PS-Poll) to the access point every Inter Packet Delay (IPD) milliseconds. In FIG. 6, the Inter Packet Delay is 30 milliseconds. For a Voice over Internet Protocol (VoIP) connection with a 30 millisecond codec rate, the second communication device may receive three voice frames per beacon, assuming a beacon every 100 milliseconds, implying maximum delay for downlink voice frames which is in the order of 100 milliseconds. This delay is generally unacceptable for interactive voice connection.

By using the method described in conjunction with FIG. 3, the second communication device does not have to wait for a beacon signal to receive buffered traffic from the access point and by appending each uplink frame with PS-Poll 604 it reduces the response time for the first communication device to fetch the buffered data for the second communication device.

As shown in FIG. 8, the second communication device has data frames waiting to be transmitted to the first communication device. The second communication device switches to first mode and sends PS-Poll 604 to receive buffered data at the first communication device. The first communication device sends an acknowledgement of the receipt of PS-Poll 604 in the form an acknowledgement frame such as an ACK frame 606. For example, access points acknowledge the receipt of the frames by sending an 802.11 ACK frame. The second communication device on receipt of ACK frame 606 transmits a data frame such as data frame 608 to the first communication device. The first communication device responds with ACK frame 606 indicating it has received the data frame 608. The second communication device stays in the second mode to receive buffered data at the first communication device. The first communication device transmits buffered data such as a buffered data 610 to the second communication device. The second communication device responds with an acknowledgement frame such as ACK 612 indicating to the first communication device that it has received the buffered data 610. If the 'More' data bit in buffered data 610 is set, then the second communication device will send PS-Poll 604 signal to the first communication device to receive any additional buffered data 610.

Further, for the above mentioned VOIP scenario, the second communication device stays in the first mode for only 1.9 milliseconds and switches back to second mode for another 30 milliseconds. It may be noted that the time for which the second communication device stays in the first mode, 1.9 milliseconds in this case, depends on a number of factors such as the codec being used, the 802.11 standard in use and such other factors.

Since the second communication device does not have to wait for the beacon signal to receive the buffered data, it receives the data frame after the uplink data frame thus reducing the delay between voice packets, thereby increasing the voice quality in voice applications.

An exemplary embodiment of the method explained in conjunction with FIG. 8 includes the following:

Second communication device senses the medium and holds back transmission, the backoff window lasts for 67 microseconds.

Second communication device transmits a Power save-Poll in 28 microseconds.

Second communication device stays in the first mode for Short Inter Frame Space (SIFS) period lasting 16 microseconds to receive an acknowledgement of the receipt of the Power-save Poll. The receipt of the acknowledgement frame takes further 28 microseconds.

Second communication device waits for another SIFS period lasting 16 microseconds before transmitting its data frame.

Second communication device transmits a data frame (using G.729 codec) in 23 microseconds to the first communication device.

Second communication device stays in the first mode for a SIFS period lasting 16 microseconds to receive an acknowledgement of the receipt of the transmitted data frame to the first communication device. The receipt of the acknowledgement frame takes further 28 microseconds.

Second communication device stays in the first mode for a random amount of time waiting for the first communication device to transmit buffered data to the second communication device. The random waiting period is taken to be 200 microseconds.

Second communication device receives buffered data from the first communication device in 23 microseconds.

Second communication device stays in the first mode for a SIFS period lasting 16 microseconds before sending an acknowledgement of the receipt of the received buffered data, to the first communication device. The receipt of the acknowledgement frame takes further 28 microseconds.

After all buffered data is transmitted by the first communication device to the second communication device, the first communication device transmits a null frame to the second communication device in 28 microseconds.

Second communication device stays in the first mode for a SIFS period lasting 16 microseconds before sending an acknowledgement of the receipt of the received null frame, to the first communication device. The receipt of the acknowledgement frame takes further 28 microseconds.

Second communication device switches from first mode to second mode.

The second communication device stays in the first mode for 1789 microseconds. Considering a beacon lasting 2100 microseconds, the total time per 100 milliseconds that devices stay in the first mode is 74 milliseconds per second.

Figure 9:
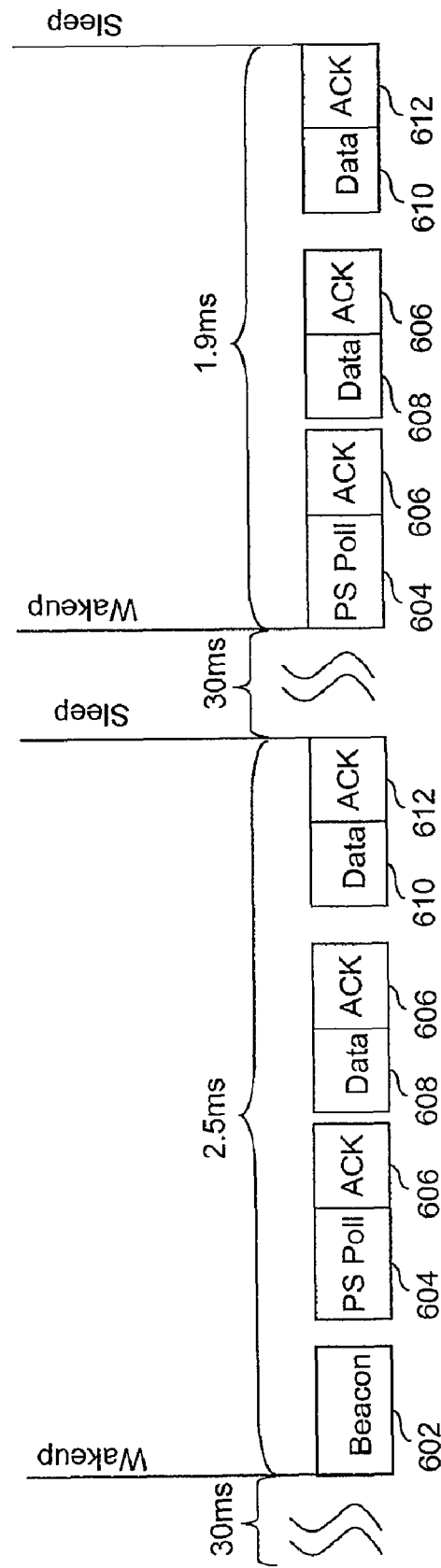
FIG. 9 is a block diagram depicting communication between the first and the second communication device in accordance with the method described in FIG. 5.

FIG. 9 is a block diagram depicting the communication between a first and a second communication device in accordance with the method described in FIG. 5. Beacon 602 transmitted by a first communication device such as first communication device 102 indicates to the second communication device such as that the first communication device has buffered data 610 for the second communication device. In this case the second communication device stays in first mode for 2.5 milliseconds from the receipt of beacon 602 and then switches back to second mode for another 30 milliseconds. The second communication device checks whether the 'More' data bit in buffered data 610 is set. If the 'More' data bit is set, the rest of the communication takes place as described in FIG. 8.

Figure 10:
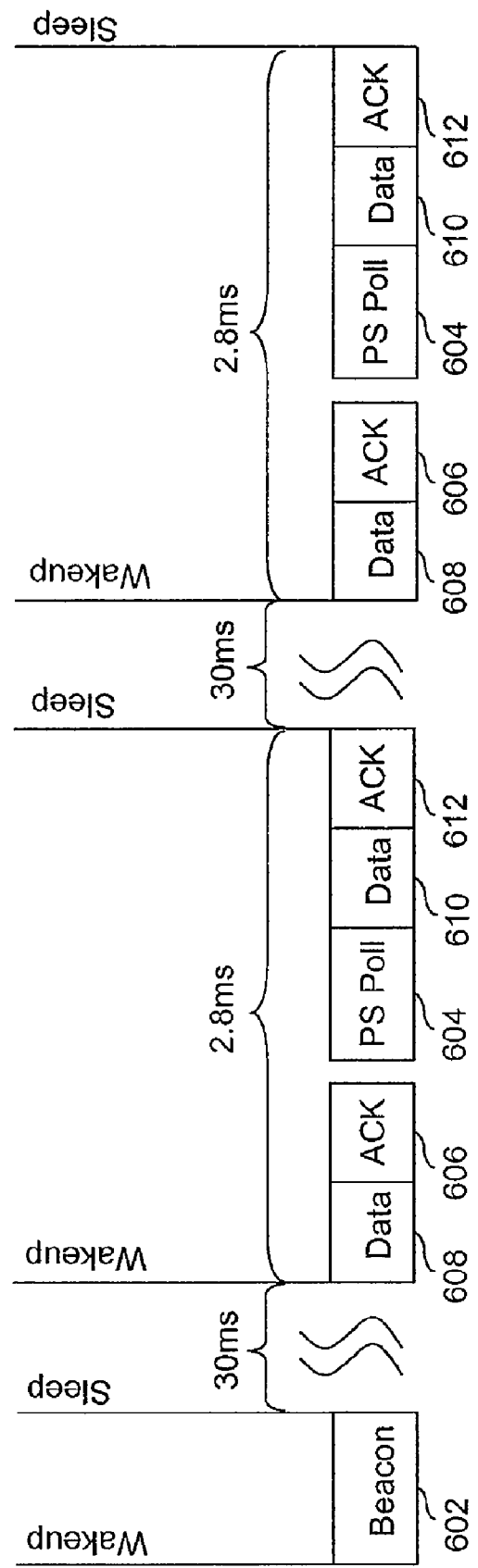
FIG. 10 is a block diagram depicting communication between the first and the second communication device in accordance with the method described in FIG. 6.

FIG. 10 is a block diagram depicting the communication between a first and a second communication device in accordance with the method described in FIG. 6. The second communication device such as second communication device 104 sends data frame 608 immediately after switching from the second mode to the first mode. On receipt of acknowledgement frame ACK 606, from a first communication device such as first communication device 102, the second communication device sends PS-Poll 604 to the first communication device requesting buffered data 610 from the first communication device. The second communication device responds by transmitting buffered data 610 to the second communication device. In this case the second communication device stays in the first mode for 2.8 milliseconds and then switches back to second mode for another 30 milliseconds.

Figure 11:
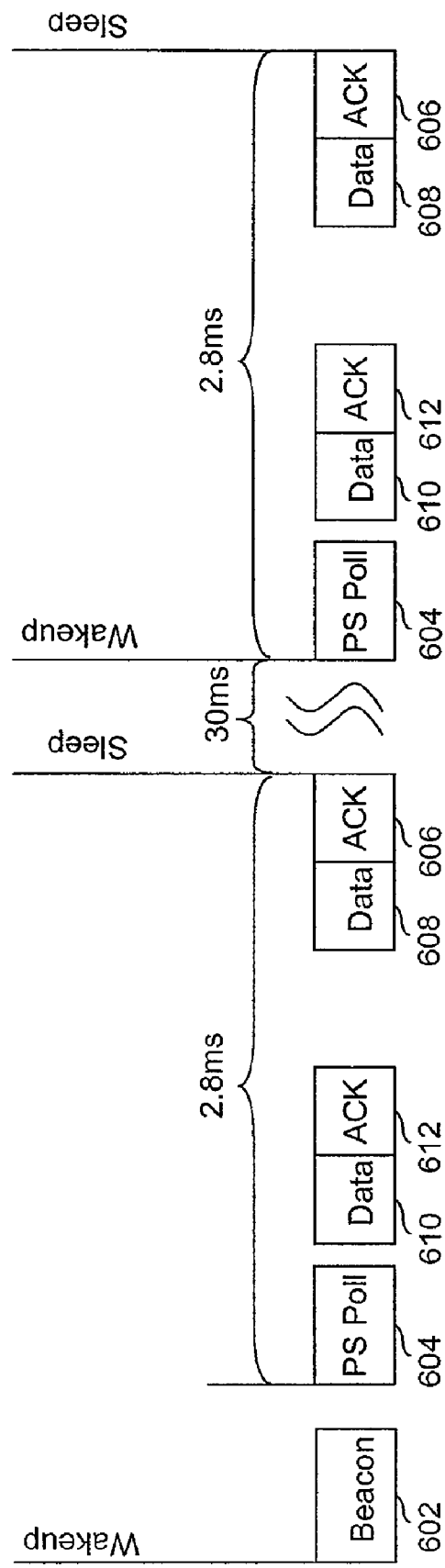
FIG. 11 is a block diagram depicting communication between the first and the second communication device in accordance with the method described in FIG. 7.

FIG. 11 is a block diagram depicting the communication between a first and a second communication device in accordance with the method described in FIG. 7. A second communication device such as second communication device 104 sends PS-Poll 604 immediately after switching from the second mode to the first mode. The second communication device stays in the first mode to receive buffered data 610 from a first communication device such as first communication device 102. The first communication device transmits buffered data 610 to the second communication device. The second communication device acknowledges the receipt of buffered data 610 with an ACK frame 612. The second communication device then transmits its data frame 608 to the first communication device. The first communication device on receipt of data frame 608 sends an acknowledgement in the form of an ACK frame 606 to the second communication device. In this case, the second communication device stays in the first mode for 2.8 milliseconds and then switches back to second mode for another 30 milliseconds.

Thus, the aforementioned embodiments potentially provide an efficient solution for reducing the overall power consumption and latency of an 802.11 compliant device engaged in wireless communication, which may preclude the need to make any substantial modification to the 802.11 compliant devices already deployed in network communication. It should be appreciated that other embodiments, not specifically illustrated herein, may also be implemented, consistent with the scope and spirit of the present invention. For example, FIGS. 8-11 each illustrate embodiments that are timed off a beacon 602. However, in other embodiments, the wakeup timing can be determined in other ways (e.g., by the occurrence of uplink data), rather than a beacon.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should also note that any of the flowcharts described herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations. Many variations and modifications may be made to the above-described embodiments. For example, the system elements such as those described above may be implemented as software modules, hardware modules, firmware and/or combinations thereof. All such modifications and variations are intended to be included herein within the scope of this disclosure.

What is claimed is:

1. A method comprising:
   determining, at a communication device, a presence of data for transmission to an access point in an uplink data frame;
   switching from a power save mode to an active mode and sending an unsolicited indication signal to the access point in response to determining the presence of data for transmission to the access point,
      wherein the unsolicited indication signal indicates that the communication device is prepared to receive buffered data from the access point,
      wherein the unsolicited indication signal is sent prior to the sending of an uplink data frame, and
      wherein the unsolicited indication signal is not sent in response to a beacon signal transmitted by the access point; and
   sending the uplink data frame to the access point in response to receiving a first acknowledgement from the access point, wherein the first acknowledgment indicates that the access point received the unsolicited indication signal.

2. The method according to claim 1, wherein the unsolicited indication signal is a Power Save Poll (PS-Poll).

3. The method according to claim 1, further comprising:
   receiving a second acknowledgement from the access point, wherein the second acknowledgment indicates that the access point received the uplink data frame;
   receiving buffered data from the access point; and
   sending a third acknowledgment to the access point, wherein the third acknowledgment indicates that the communication device received the buffered data.

4. The method according to claim 3, further comprising switching from the active mode to the power save mode if a More data bit is not set in the buffered data.

5. The method according to claim 1, further comprising:
   receiving from the access point at least one Null data frame indicating that there is no buffered data at the access point; and
   switching from the active mode to the power save mode.

6. The method according to claim 1, wherein the communication device is an 802.11 compliant communication device.

7. The method according to claim 1, wherein the uplink data frame comprises voice data.

8. The method according to claim 1, wherein the communication device is configured to communicate in accordance with the Voice over Internet Protocol (VoIP).

9. A method comprising:
   receiving an unsolicited indication signal at an access point,
      wherein the unsolicited indication signal indicates that a communication device is prepared to receive buffered data from the access point,
      wherein the unsolicited indication signal is received prior to an uplink data frame, and
      wherein the unsolicited indication signal is not received in response to a beacon signal transmitted by the access point;
   sending a first acknowledgment to the communication device, wherein the first acknowledgement indicates that the access point received the unsolicited indication signal;
   receiving the uplink data frame from the communication device
   transmitting a second acknowledgement to the communication device, wherein the second acknowledgment indicates that the access point received the uplink data frame; and
   transmitting the buffered data to the communication device.

10. A communication device comprising:
    an signal generator configured to generate an unsolicited indication signal, wherein the unsolicited indication signal indicates that the communication device is prepared to receive buffered data from an access point;
    a communication interface configured to communicate with the access point; and
    program logic stored in data storage and executable by at least one processor to:
       cause the communication device to switch from a power save mode to an active mode and to send the unsolicited indication signal to the access point in response to determining the presence of data for transmission to the access point in an uplink data frame;
          wherein the unsolicited indication signal is sent prior to the uplink data frame, and
          wherein the unsolicited indication signal is not sent in response to a beacon signal transmitted by the access point; and
       cause the communication interface to send the uplink data frame to the access point in response to receiving a first acknowledgement from the access point, wherein the first acknowledgment indicates that the access point received the unsolicited indication signal.

11. The communication device according to claim 10, further comprising program logic stored in data storage and executable by at least one processor to:
    cause the communication device to receive a second acknowledgement from the access point, wherein the second acknowledgment indicates that the access point received the uplink data frame;
    cause the communication device to receive buffered data from the access point; and
    cause the communication device to send a third acknowledgment to the access point, wherein the third acknowledgment indicates that the communication device received the buffered data.

12. The communication device according to claim 11, further comprising program logic stored in data storage and executable by the at least one processor to:
    cause the communication device to switch from the active mode to the power save mode if a More data bit in not set in the buffered data.

13. The communication device system according to claim 10, wherein the uplink data frame comprises voice data.

14. The communication device according to claim 10, wherein the communication device is a 802.11 compliant communication device.

15. The communication device according to claim 10, wherein the communication device is configured to communicate in accordance with the Voice over Internet Protocol (VoIP).

16. A non-transitory computer-readable medium having instructions stored thereon, the instructions comprising:
  instructions for determining, at a communication device, a presence of data for transmission to an access point in an uplink data frame;
  instructions for switching from a power save mode to an active mode and sending an unsolicited indication signal to the access point in response to determining the presence of data for transmission to the access point,
    wherein the unsolicited indication signal indicates that the communication device is prepared to receive buffered data from the access point,
    wherein the unsolicited indication signal is sent prior to the sending of an uplink data frame, and
    wherein the unsolicited indication signal is not sent in response to a beacon signal transmitted by the access point; and
  instructions for sending the uplink data frame to the access point in response to receiving a first acknowledgement from the access point, wherein the first acknowledgment indicates that the access point received the unsolicited indication signal.

17. The non-transitory computer-readable medium according to claim 16, further comprising:
  instructions for receiving a second acknowledgement from the access point, wherein the second acknowledgment indicates that the access point received the uplink data frame;
  instructions for receiving buffered data from the access point; and
  instructions for sending a third acknowledgment to the access point, wherein the third acknowledgment indicates that the communication device received the buffered data.

* * * * *

UNITED STATES PATENT AND TRADEMARK OFFICE
CERTIFICATE OF CORRECTION

| | | |
|---|---|---|
| PATENT NO. | : 8,014,323 B2 | Page 1 of 1 |
| APPLICATION NO. | : 11/556916 | |
| DATED | : September 6, 2011 | |
| INVENTOR(S) | : Wentink et al. | |

It is certified that error appears in the above-identified patent and that said Letters Patent is hereby corrected as shown below:

Column 12, line 23, in Claim 10, delete "an signal" and insert -- a signal --.

Column 12, line 64, in Claim 12, delete "More data bit in not set" and insert -- More data bit is not set --.

Column 12, line 66, in Claim 13, delete "device system" and insert -- device --.

Signed and Sealed this
Twenty-eighth Day of February, 2012

David J. Kappos
*Director of the United States Patent and Trademark Office*